United States Patent
Cai et al.

(10) Patent No.: US 8,977,238 B2
(45) Date of Patent: Mar. 10, 2015

(54) INTERFACE BETWEEN WEB APPLICATIONS FOR TEXT MESSAGING AND PACKET-SWITCHED NETWORKS

(71) Applicants: Yigang Cai, Naperville, IL (US); Gyan Shanker, Naperville, IL (US); Kris Nayak, Naperville, IL (US)

(72) Inventors: Yigang Cai, Naperville, IL (US); Gyan Shanker, Naperville, IL (US); Kris Nayak, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 8 days.

(21) Appl. No.: 13/868,349

(22) Filed: Apr. 23, 2013

(65) Prior Publication Data
US 2013/0238733 A1  Sep. 12, 2013

Related U.S. Application Data (62) Division of application No. 13/160,703, filed on Jun. 15, 2011, now Pat. No. 8,457,666.

(51) Int. Cl.
H04W 88/02 (2009.01)
H04L 12/58 (2006.01)
H04L 29/06 (2006.01)

(52) U.S. Cl.
CPC .............. H04L 51/00 (2013.01); H04L 51/38 (2013.01); H04L 65/1006 (2013.01); H04L 65/104 (2013.01); H04L 51/066 (2013.01)
USPC ........................................................ 455/411

(58) Field of Classification Search
USPC ................ 455/411, 466; 715/763; 379/88.13
See application file for complete search history.

(56) References Cited

U.S. PATENT DOCUMENTS

| | | | |
|---|---|---|---|
| 2009/0249454 A1* | 10/2009 | Yamamoto et al. | 726/5 |
| 2009/0327394 A1* | 12/2009 | Kaji et al. | 709/201 |
| 2011/0138409 A1* | 6/2011 | Svensson et al. | 725/25 |
| 2013/0172028 A1* | 7/2013 | McNamara et al. | 455/466 |

* cited by examiner

*Primary Examiner* — Diane Mizrahi
(74) *Attorney, Agent, or Firm* — Duft Bornsen & Fettig, LLP

(57) ABSTRACT

Systems and methods are disclosed for interfacing SMS/MMS web applications with packet-switched networks. One embodiment comprises a system that handles a Mobile Terminated (MT) text message from a web application to a packet-switched network. The system receives a send command for the MT text message from the web application. The send command is based on a standard used by the web application, such as Parlay X. The system converts the send command for the MT text message to a SIP send request, and transmits the SIP send request for the MT text message to a packet-switched network for delivery to a recipient.

9 Claims, 8 Drawing Sheets

INTERFACE BETWEEN WEB APPLICATIONS FOR TEXT MESSAGING AND PACKET-SWITCHED NETWORKS

RELATED APPLICATIONS

The patent application is a divisional of a co-pending U.S. patent application having the Ser. No. 13/160,703, and filed on Jun. 15, 2011, which is incorporated by reference herein.

FIELD OF THE INVENTION

The invention is related to the field of communications and, in particular, to interfacing text messaging web applications with packet-switched networks that use Session Initiation Protocol (SIP).

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Although text messaging is traditionally thought of as two mobile devices exchanging text messages, there may be web-based applications that allow an end user to send or receive text messages. For example, an end user may access a web site that provides a page for sending/receiving text messages. Through the web page, the end user may enter a message intended for a recipient and a telephone number for the recipient. The web-based application then generates a send request for the text message using an Application Programming Interface (API) defined for web-based services.

Organizations have defined standard APIs for web-based applications to use when sending/receiving text messages. One standard is Parlay X SMS Web Service for SMPP. Parlay X SMS Web Service for SMPP provides operations for sending an SMS message to a network, monitoring the delivery status of a sent SMS message, and asynchronously receiving notification of message delivery status. Parlay X SMS Web Service for SMPP interacts with a native SMPP network to send/receive SMS messages.

Another standard is Parlay X SMS Web Service for Parlay. Parlay X SMS Web Service for Parlay provides operations for sending an SMS message to the network, monitoring the delivery status of a sent SMS message, and asynchronously receiving notification of message delivery status. Parlay X SMS Web Service for Parlay interacts with a Parlay gateway using a Parlay Connector to send/receive SMS messages to/from a network.

Unfortunately, the standard APIs presently defined for web services do not provide enough flexibility for today's evolving networks.

SUMMARY

Embodiments described herein provide a system, such as an API, that interfaces SMS/MMS web applications with packet-switched networks. The system is able to translate messages from a web application to Session Initiation Protocol (SIP) that is used within the packet-switched network for SMS/MMS messaging. Also, the system is able to translate SIP messages from the packet-switched network to the standard used by the web application, such as from SIP to Parlay X. By converting between the standard used by a web application and SIP, text messages may be exchanged directly between the web application and the packet-switched network. This advantageously improves how web-based text messaging may be implemented in evolving networks, such as IMS networks or LTE networks.

One embodiment comprises a system that handles a Mobile Terminated (MT) text message from a web application to a packet-switched network. The system includes an interface operable to receive a send command for the MT text message from the web application. The send command is based on a standard used by the web application, such as Parlay X. The system further includes a controller operable to convert the send command for the MT text message to a SIP send request. The interface is further operable to transmit the SIP send request for the MT text message to a packet-switched network for delivery to a recipient.

In another embodiment, the system is able to handle a Mobile Originated (MO) text message from the packet-switched network to the web application. The interface is operable to receive a SIP send request for the MO text message from the packet-switched network. The controller is further operable to convert the SIP send request for the MO text message to a receive command based on the standard used by the web application. The interface is further operable to transmit the receive command for the MO text message to the web application.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
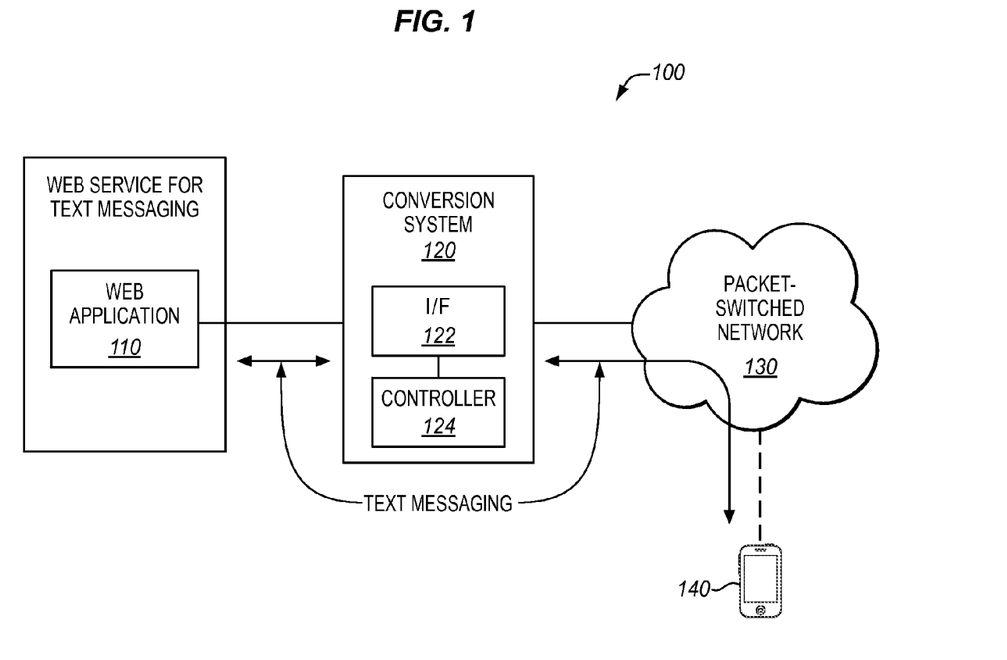
FIG. 1 illustrates a communication system in an exemplary embodiment.

FIG. 1 illustrates a communication system 100 in an exemplary embodiment. Communication system 100 includes a web application 110 coupled to a packet-switched network 130 through a conversion system 120. Web application 110 is part of a web-based service for sending and receiving text messages, such as SMS messages or MMS messages. Packet-switched network 130 comprises any network that exchanges communications using packets, such as IP packets. Packet-switched network 130 may comprise an IMS network, an LTE network, or any other IP-based network. Packet-switched network 130 may include a variety of network nodes (not shown) in order to provide voice and/or data services to User Equipment (UE) 140. More particularly, a network node of packet-switched network 130 provides a text messaging service to UE 140.

Web application 110 is able to exchange text messages with UE 140 with the assistance of conversion system 120. Conversion system 120 acts to translate function calls, operations, or commands used by web application 110 to requests/responses used in packet-switched network 130, and vice-versa. Conversion system 120 may be thought of as an Application Programming Interface (API), as it converts standardized commands from web application 110 to a signaling protocol used in packet-switched network 130. In this embodiment, the signaling protocol used in packet-switched network 130 is Session Initiation Protocol (SIP). The standard used by web application 110 may vary, but one example of the standard may be Parlay X.

Conversion system 120 includes an interface 122 and a controller 124. Interface 122 comprises any device or component that communicates with web application 110 and/or other web applications not shown. Interface 122 is also able to communicate with packet-switched network 130 through a signaling protocol used within packet-switched network 130 (i.e., SIP). Controller 124 comprises any device or component that translates messages between a standard used by web application 110 and the signaling protocol used in packet-switched network 130.

Assume that a user of web application 110 creates a text message intended for UE 140. This is referred to as a Mobile Terminated (MT) or Application Originated (AO) text message. When this occurs, web application 110 generates a function call, operation, or command for sending the MT text message based on the standard it is using. For example, if web application 110 uses Parlay X, then web application 110 may use a "SendSms" command that encapsulates the MT text message as a command for sending the MT text message. The command for sending the MT text message is referred to herein generally as a send command. Web application 110 then transmits the send command to conversion system 120.

Figure 2:
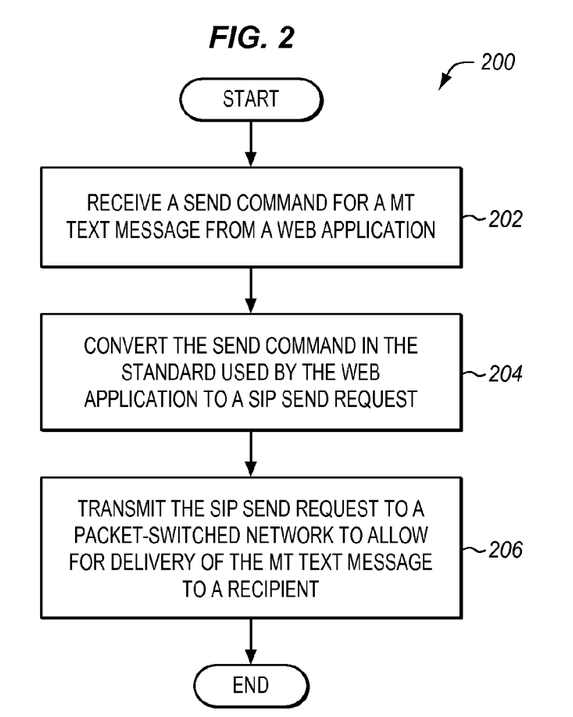
FIG. 2 is a flow chart illustrating a method of handling a MT text message from a web application to user equipment (UE) in an exemplary embodiment.

FIG. 2 is a flow chart illustrating a method 200 of handling the MT text message from web application 110 to UE 140 in an exemplary embodiment. The steps of method 200 will be described with reference to conversion system 120 in FIG. 1, but those skilled in the art will appreciate that methods described herein may be performed in other systems. The steps of the flow charts described herein are not all inclusive and may include other steps not shown. The steps may also be performed in an alternative order.

In step 202, interface 122 receives the send command for the MT text message from web application 110. In step 204, controller 124 converts the send command in the standard used by web application 110 to a SIP send request. The SIP send request is used for sending the MT text message in packet-switched network 130. One example of the SIP send request is a SIP MESSAGE that encapsulates the MT text message, and is used for transporting a text message within packet-switched network 130. In order to perform the conversion, controller 124 may store a table that maps the standardized commands from the standard used by web application 110 to SIP Methods. The table may also map fields from the standardized commands (e.g., source address, terminating address, message type, etc.) to fields in a SIP message. Controller 124 may use this table to convert the send request from web application 110 to the SIP send request.

In step 206, interface 122 transmits the SIP send request to packet-switched network 130 so that the MT text message may be delivered to its intended recipient, which is UE 140. It is presumed that packet-switched network 130 uses SIP to transport text messages. Thus, the appropriate node in packet-switched network 130 may attempt delivery of the MT text message to UE 140 without conversion to another protocol.

A similar process as above is used for delivering a text message from UE 140 to web application 110. Assume that an end user of UE 140 creates a text message intended for web application 110. This is referred to as a Mobile Originated (MO) or Application Terminated (AT) text message. When this occurs, a text message application in UE 140 generates a SIP send request for sending the MO text message, such as a SIP MESSAGE. UE 140 then transmits the SIP send request to conversion system 120.

Figure 3:
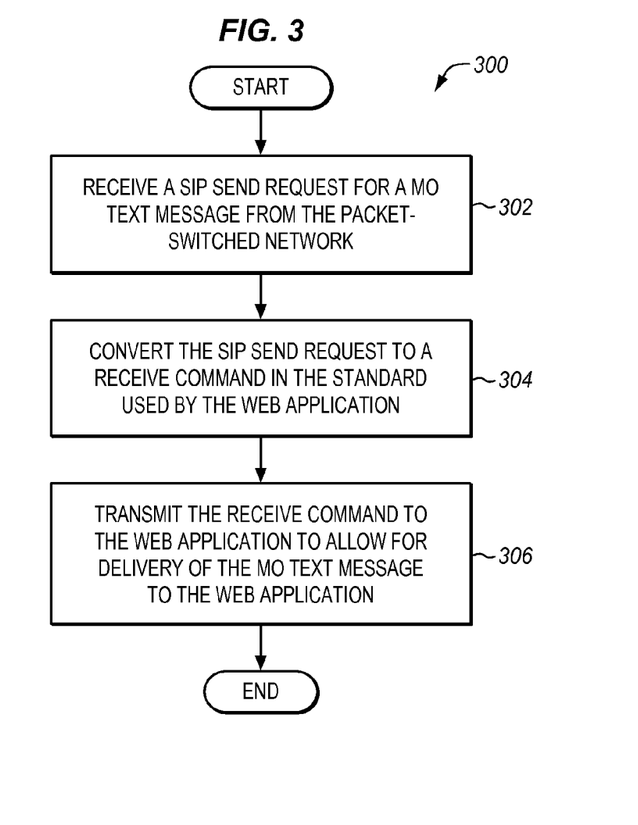
FIG. 3 is a flow chart illustrating a method of handling a MO text message from a UE to a web application in an exemplary embodiment.

FIG. 3 is a flow chart illustrating a method 300 of handling the MO text message from UE 140 to web application 110 in an exemplary embodiment. In step 302, interface 122 receives the SIP send request for the MO text message from UE 140. In step 304, controller 124 converts the SIP send request to a receive command in the standard used by web application 110. The receive command is a function call, operation, or command in the standard used by web application 110 for receiving the MO text message. For example, if web application 110 uses Parlay X, then web application 110 may use a "NotifySmsReception" or a "GetReceivedSms" return that encapsulates the MO text message as a command to receive the MO text message. The command for receiving the MO text message in web application 110 is referred to herein generally as a receive command. In step 306, interface 122 transmits the receive command to web application 110 so that the MO text message may be delivered to web application 110. Web application 110 may then process the receive command to extract the MO text message, and display the MO text message to a user.

Figure 4:
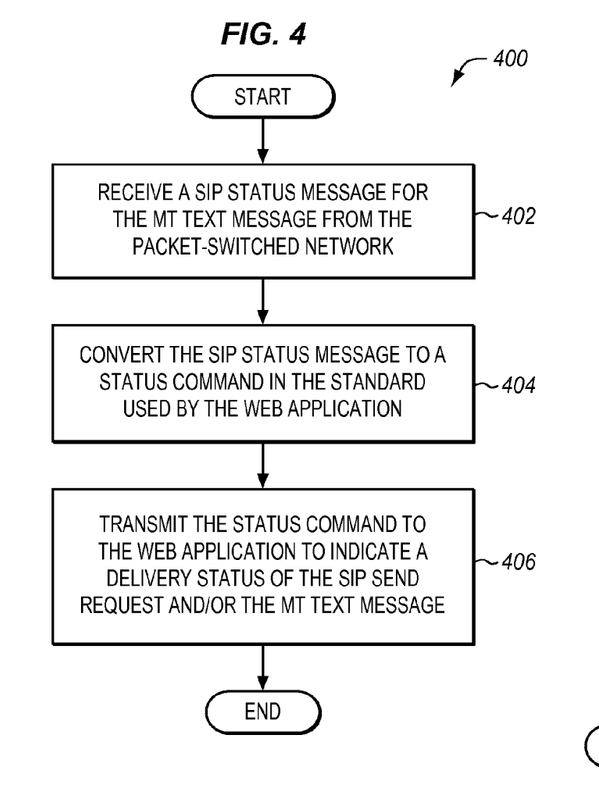
FIG. 4 is a flow chart illustrating a method of handling a SIP status message from a packet-switched network to a web application in an exemplary embodiment.
Figure 5:
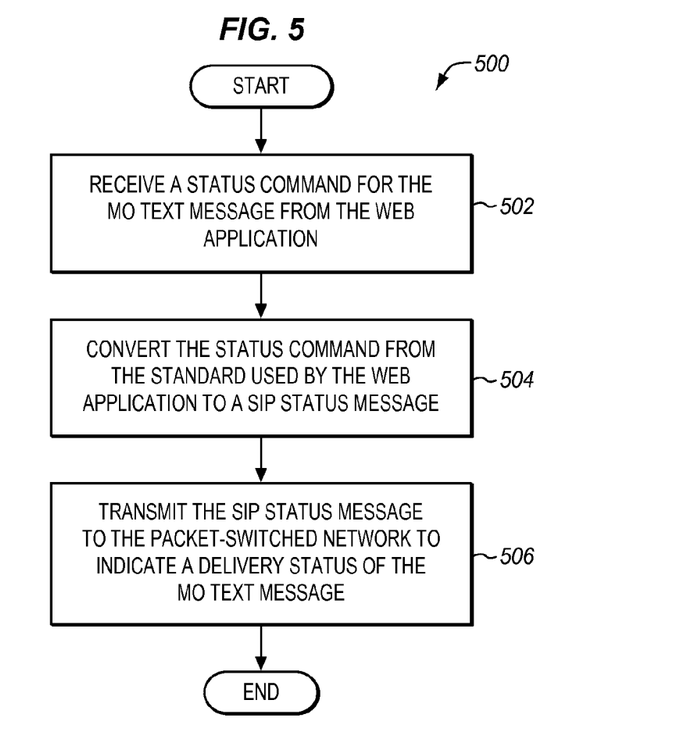
FIG. 5 is a flow chart illustrating a method of handling a status command from a web application to a packet-switched network in an exemplary embodiment.

When MT and MO text messages are sent as described in the above embodiments, there may be additional communications exchanged to indicate whether the text messages are successfully delivered. These communications may be referred to as notifications, acknowledgements, status messages, etc. Conversion system 120 is able to translate these additional communications in a similar manner as described above. FIGS. 4-5 illustrate conversion of communications that carry status information for text message delivery. There may be additional communications sent to exchange the status information between web application 110 and packet-switched network 130 than those described in FIGS. 4-5. More detailed message diagrams are provided in FIGS. 7-10.

When packet-switched network 130 receives a SIP send request for a MT text message (see step 206 of FIG. 2), packet-switched network 130 attempts to deliver the MT text message to UE 140. If delivery of the MT text message is successful or fails, packet-switched network 130 generates a SIP status message that includes status information for the delivery of the MT text message. The SIP status message may comprise another SIP MESSAGE, a SIP NOTIFY, or a SIP response such as a SIP 7xx message. Packet-switched network 130 then transmits the SIP status message to conversion system 120.

FIG. 4 is a flow chart illustrating a method 400 of handling a SIP status message from packet-switched network 130 to web application 110 in an exemplary embodiment. In step 402, interface 122 receives the SIP status message for the MT text message from packet-switched network 130. In step 404, controller 124 converts the SIP status message to a status command in the standard used by web application 110. For example, if web application 110 uses Parlay X, then the status command may comprise a "NotifySmsReception" or a "NotifySmsDeliveryReceipt" command that encapsulates the status information. In step 406, interface 122 transmits the status command to web application 110. Web application 110 may then extract the status information from the status command, and process the status information as desired.

For a MO text message delivery (see step 306 of FIG. 3), web application 110 is able to generate status information for delivery of the MO text message. If delivery of the MO text message is successful or fails, web application 110 generates a status command that includes the status information. The status command may comprise a "NotifySmsDeliveryReceipt" command that encapsulates the status information. Web application 110 then transmits the status command to conversion system 120.

FIG. 5 is a flow chart illustrating a method 500 of handling the status command from web application 110 to packet-switched network 130 in an exemplary embodiment. In step 502, interface 122 receives the status command for the MO text message from web application 110. In step 504, controller 124 converts the status command in the standard used by web application 110 to a SIP status message. One example of a SIP status message is a SIP MESSAGE that encapsulates the status information, such as in the RP-DATA. In step 506, interface 122 transmits the SIP status message to packet-switched network 130. Packet-switched network 130 may then extract the status information from the SIP status message, and process the status information as desired.

Conversion system 120 as described above allows for web-based text messaging to be implemented in evolving packet-switched networks that use SIP. For example, conversion system 120 may be used to implement web-based text messaging in IMS networks and LTE networks. This can advantageously increase revenues for IMS and LTE service providers.

EXAMPLES

Figure 6:
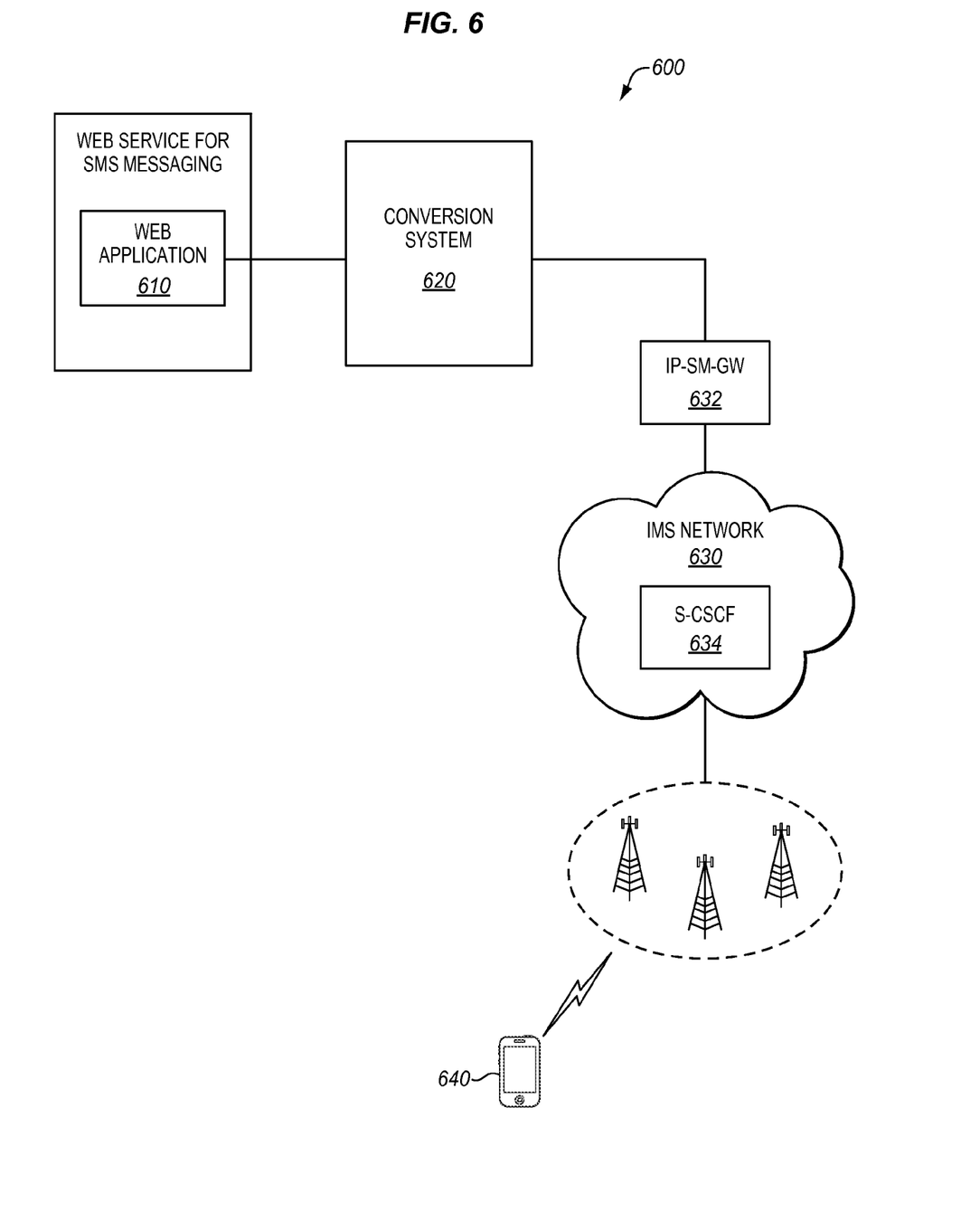
FIG. 6 illustrates a communication system in another exemplary embodiment.

FIG. 6 illustrates a communication system 600 in another exemplary embodiment. Communication system 600 includes a web application 610 coupled to an IMS network 630 through a conversion system 620 and an IP Short Message Gateway (IP-SM-GW) 632. IMS network 630 includes a Serving-Call Session Control Function (S-CSCF) 634 that serves a UE 640. Web application 610 uses Parlay X for sending/receiving text messages. Therefore, conversion system 620 is able to convert Parlay X commands to SIP messages, and vice-versa. Conversion system 620 may be thought of as a new API that provides Parlay X SMS Web Service for SIP. Parlay X SMS Web Service for SIP provides operations for a web application to send a MT SMS message to a packet-switched (IP) network, to receive a MO SMS message from the packet-switched network, to send/receive acknowledgement message to/from the packet-switched network for MT/MO messages, and to asynchronously receive notification of message delivery status. The examples shown in FIGS. 7-10 further illustrate how conversion system 620 interfaces web application 610 with IMS network 630.

Figure 7:
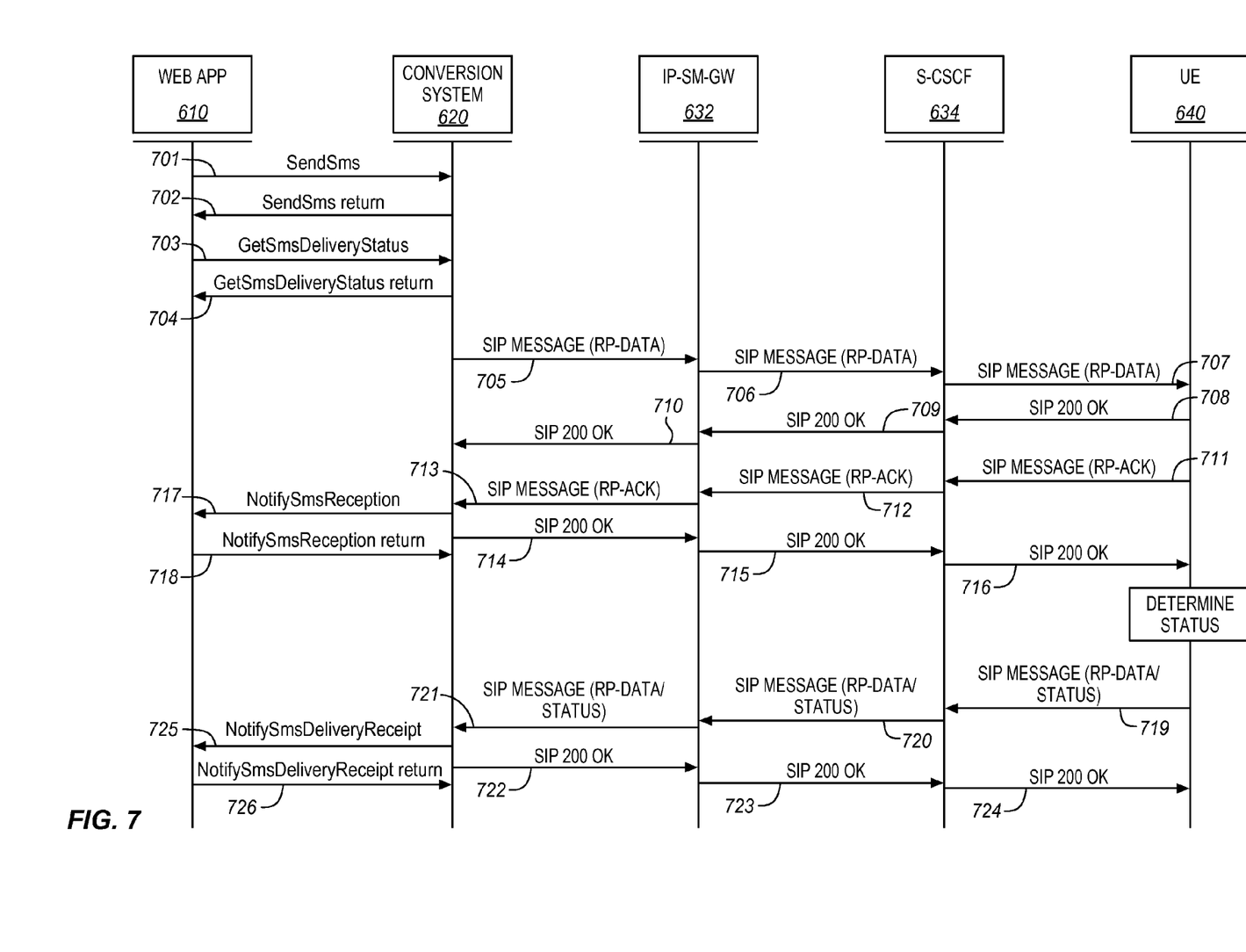
FIG. 7 is a message diagram illustrating a call flow for a MT SMS message in an exemplary embodiment.

FIG. 7 is a message diagram illustrating a call flow for a MT SMS message in an exemplary embodiment. Assume for one example that a user of web application 610 creates a MT SMS message intended for UE 640. When this occurs, web application 610 generates a SendSms command for sending the MT SMS message based on Parlay X. Web application 610 then transmits the Parlay X SendSms command to conversion system 620 (see arrow 701). Conversion system 620 responds back to web application 610 with a SendSms return (see arrow 702). Web application 610 also transmits a GetSmsDeliveryStatus command to conversion system 620 to request status information on the delivery of the MT SMS message (see arrow 703). Conversion system 620 responds back to web application 610 with a GetSmsDeliveryStatus return (see arrow 704).

In response to the SendSms command, conversion system 620 converts the SendSms command to a SIP MESSAGE that encapsulates the SMS message. More particularly, the SMS message is embedded in the RP-DATA (e.g., RP-User Data field) of the SIP MESSAGE. In order to translate the Parlay X command to a SIP request, conversion system 620 may use mapping tables. Table 1 illustrates one mapping table that relates Parlay X commands (or methods) to SIP Methods.

TABLE 1

| Parlay X SMS Interface | Parlay X Method | SIP Method |
|---|---|---|
| SendSms | SendSms SendSmsLogo SendSmsRingtone | SIP MESSAGE with RP-DATA encapsulated |
| | GetSmsDeliveryStatus | SIP SUBSCRIBE or delivery status request embedded in RP-DATA/TP-SRI or TP-SRR |
| SmsNotification | NotifySmsReception | SIP MESSAGE with RP-DATA/ACK/ERROR encapsulated |
| | NotifySmsDeliveryReceipt | SIP NOTIFY or SIP MESSAGE with delivery status/receipt embedded in RP-DATA |

TABLE 1-continued

| Parlay X SMS Interface | Parlay X Method | SIP Method |
|---|---|---|
| ReceiveSms | GetReceivedSms (return) | SIP MESSAGE with RP-DATA encapsulated |
| SmsNotificationManager | StartSmsNotification | N/A |
| | StopSmsNotification | N/A |

As is evident in Table 1, a SendSms command is mapped to a SIP MESSAGE. Conversion system 620 is also able to normalize source and destination addresses between Parlay X commands and SIP messages. The address information is included in both SIP headers (like Request URI, To, From, Route, P-Asserted-Identity headers) and 3GPP SMS Relay (RP) and Transfer (TP) layers. For example, RP-DATA that is encapsulated in a SIP MESSAGE may have the parameters (see 3GPP TS 24.011) shown in Table 2:

TABLE 2

| Information element | Presence | Usage for Parlay X mapping |
|---|---|---|
| RP-Message Type | M | Set to 001 for RP-DATA |
| RP-Message Reference | M | This will be part of message identity of Parlay X message |
| RP-Originator Address | M | Source address |
| RP-Destination Address | M | Destination address |
| RP-User Data | M | SMS data |

When the RP-User Data field includes an SMS-DELIVER TPDU for MT SMS messages (see 3GPP TS 23.040), the RP-User Data may have the parameters illustrated in Table 3.

TABLE 3

| Abbr. | Reference | P | Description |
|---|---|---|---|
| TP-MTI | TP-Message-Type-Indicator | M | Parameter describing the message type |
| TP-MMS | TP-More-Messages-to-Send | M | Parameter indicating whether or not there are more messages to send |
| TP-LP | TP-Loop-Prevention | M | Parameter indicating that SMS applications should inhibit forwarding or automatic message generation that could cause infinite looping. Should be set to 0 |
| TP-RP | TP-Reply-Path | M | Parameter indicating that Reply Path exists |
| TP-UDHI | TP-User-Data-Header-Indicator | O | Parameter indicating that the TP-UD field contains a Header |
| TP-SRI | TP-Status-Report-Indication | O | Parameter indicating if the SME has requested a status report. Could optionally be set to 1 if Parlay X GetSmsDeliveryStatus received |
| TP-OA | TP-Originating-Address | M | Address of the originating SME |
| TP-PID | TP-Protocol-Identifier | M | Parameter identifying the above layer protocol, if any |
| TP-DCS | TP-Data-Coding-Scheme | M | Parameter identifying the coding scheme within the TP-User-Data |
| TP-SCTS | TP-Service-Centre-Time-Stamp | M | Parameter identifying time when the SC received the message |
| TP-UDL | TP-User-Data-Length | M | Parameter indicating the length of the TP-User-Data field to follow |
| TP-UD | TP-User-Data | O | SMS body |

After converting the SendSms command to a SIP MESSAGE, conversion system 620 transmits the SIP MESSAGE to IP-SM-GW 632 (see arrow 705). IP-SM-GW 632 in turn forwards the SIP MESSAGE to S-CSCF 634 of IMS network 630 (see arrow 706). Because the SMS message is already encapsulated within a SIP MESSAGE, IP-SM-GW 632 does not have to convert the message from another protocol (e.g., SMPP) to SIP. S-CSCF 634 then delivers the SIP MESSAGE to UE 640 (see arrow 707). In response to the SIP MESSAGE, UE 640 replies back to conversion system 620 with a SIP 200 OK (see arrows 708-710).

The SIP MESSAGE sent to UE 640 includes an embedded delivery status request in TP-SRI (see Table 3). Because the SIP MESSAGE was successfully received, UE 640 sends a SIP MESSAGE to conversion system 620 that includes the status information for the original SIP MESSAGE that carried the SMS message (see arrows 711-713). More particularly, the status information is embedded in the RP-ACK of the SIP MESSAGE. Conversion system 620 replies back to UE 640 with a SIP 200 OK (see arrows 714-716).

In response to the SIP MESSAGE that includes the status information for the SIP MESSAGE, conversion system 620 converts the SIP MESSAGE into a Parlay X NotifySmsReception command that encapsulates the status information. Conversion system 620 then transmits the NotifySmsReception command to web application 610 (see arrow 717). Web application 610 replies back to conversion system 620 with a NotifySmsReception return (see arrow 718).

In addition to providing status information for the SIP MESSAGE, UE 640 is able to determine whether the MT SMS message itself was successfully delivered. Even though a SIP MESSAGE that encapsulates the MT SMS message was successfully received in UE 640, the MT SMS message itself may be corrupted in some manner so that it cannot be processed and displayed to an end user. Therefore, UE 640 is able to determine whether the MT SMS message was processed and provided to the end user, and to generate status information for delivery of the MT SMS message.

UE 640 transmits another SIP MESSAGE to conversion system 620 that includes the status information for the SMS message (see arrows 719-721). The status information is embedded in the RP-DATA/Status of the SIP MESSAGE. Conversion system 620 replies back to UE 640 with a SIP 200 OK (see arrows 722-724).

In response to the SIP MESSAGE that includes the status information for the SMS message, conversion system 620 converts the SIP MESSAGE into a Parlay X NotifySmsDeliveryReceipt command that encapsulates the status information. Conversion system 620 then transmits the NotifySms- DeliveryReceipt command to web application 610 (see arrow 725). Web application 610 replies to conversion system 620 with a NotifySmsDeliveryReceipt return (see arrow 726). There may be additional messaging that is used to deliver the MT SMS message and its associated status information, as FIG. 7 gives an overview of the messaging used in the SMS delivery.

Figure 8:
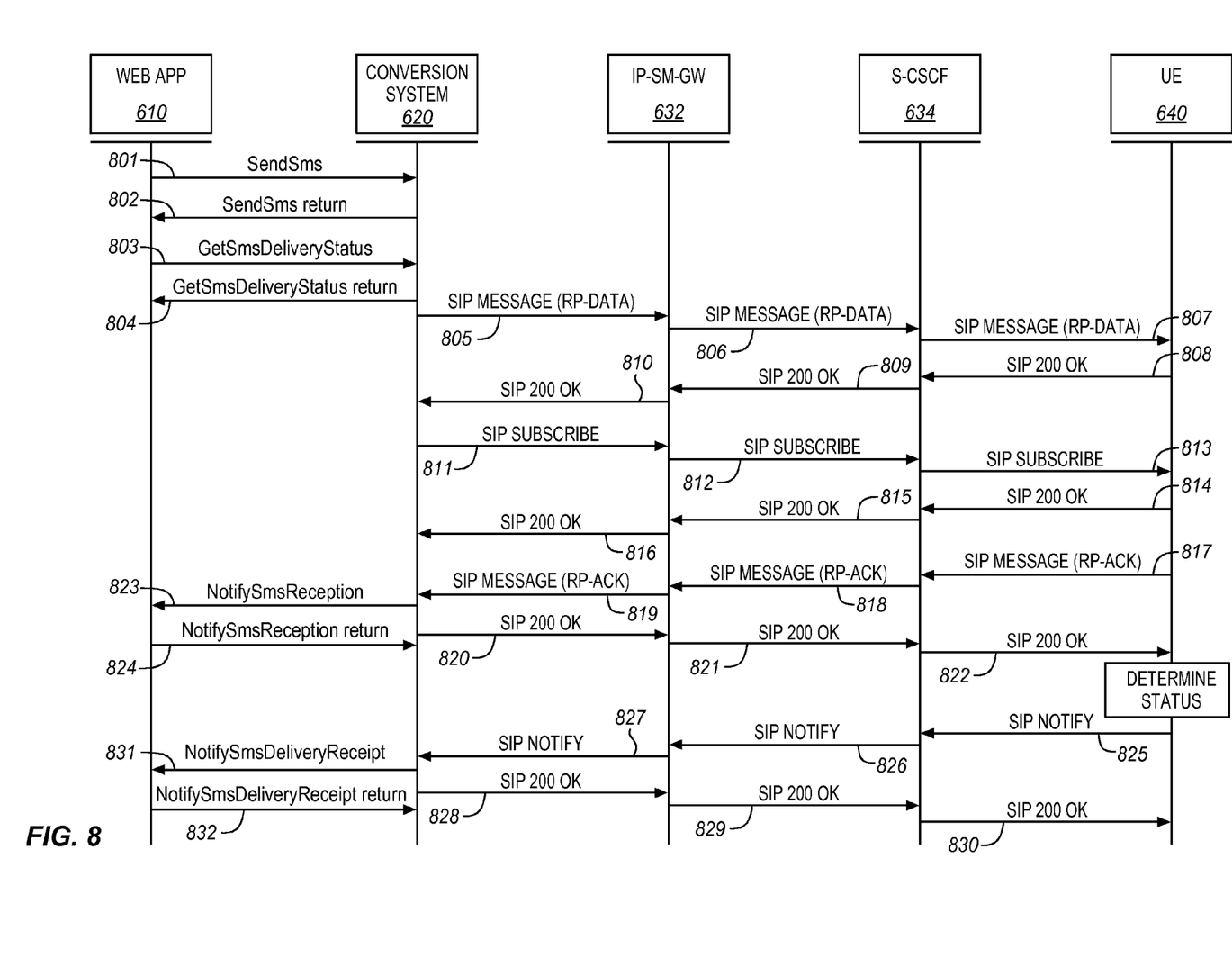
FIG. 8 is a message diagram illustrating another call flow for a MT SMS message in an exemplary embodiment.

FIG. 8 is a message diagram illustrating another call flow for a MT SMS message in an exemplary embodiment. The flow in FIG. 8 is similar to FIG. 7 where the MT SMS message is sent from web application 610 to UE 640 through conversion system 620 (see arrows 801-810). Instead of embedding a delivery status request in the TP-SRI (see Table 3) of the SIP MESSAGE, conversion system 620 requests to be notified of the delivery status of the MT SMS message using a SIP SUBSCRIBE. Thus, conversion system 620 transmits the SIP SUBSCRIBE to UE 640 requesting to be notified of the delivery status for the SIP MESSAGE and the SMS message (see arrows 811-813). UE 640 responds back to conversion system 620 with a SIP 200 OK (see arrows 814-816).

UE 640 determines the delivery status of the SIP MESSAGE that encapsulated the MT SMS message, and generates status information for the SIP MESSAGE. Because the SIP MESSAGE was successfully received, UE 640 sends a SIP MESSAGE to conversion system 620 that includes the status information for the SIP MESSAGE embedded in the RP-ACK of the SIP MESSAGE (see arrows 817-819). Conversion system 620 replies back to UE 640 with a SIP 200 OK (see arrows 820-822). Conversion system 620 then converts the SIP MESSAGE into a Parlay X NotifySmsReception command that encapsulates the status information for the SIP MESSAGE. Conversion system 620 transmits the NotifySmsReception command to web application 610 (see arrow 823). Web application 610 replies to conversion system 620 with a NotifySmsReception return (see arrow 824). Web application 610 may then process the status information for the original SIP MESSAGE as desired.

UE 640 also determines whether the MT SMS message was successfully delivered, and generates status information for the MT SMS message. UE 640 sends a SIP NOTIFY to conversion system 620 that includes the status information for the MT SMS message (see arrows 825-827). Conversion system 620 replies back to UE 640 with a SIP 200 OK (see arrows 828-830).

In response to the SIP NOTIFY that includes the status information for the MT SMS message, conversion system 620 converts the SIP NOTIFY into a Parlay X NotifySmsDeliveryReceipt command that encapsulates the status information. Conversion system 620 then transmits the NotifySmsDeliveryReceipt command to web application 610 (see arrow 831). Web application 610 replies to conversion system 620 with a NotifySmsDeliveryReceipt return (see arrow 832). There may be additional messaging that is used to deliver the MT SMS message and its associated status information, as FIG. 8 gives an overview of the messaging used in the SMS delivery.

Figure 9:
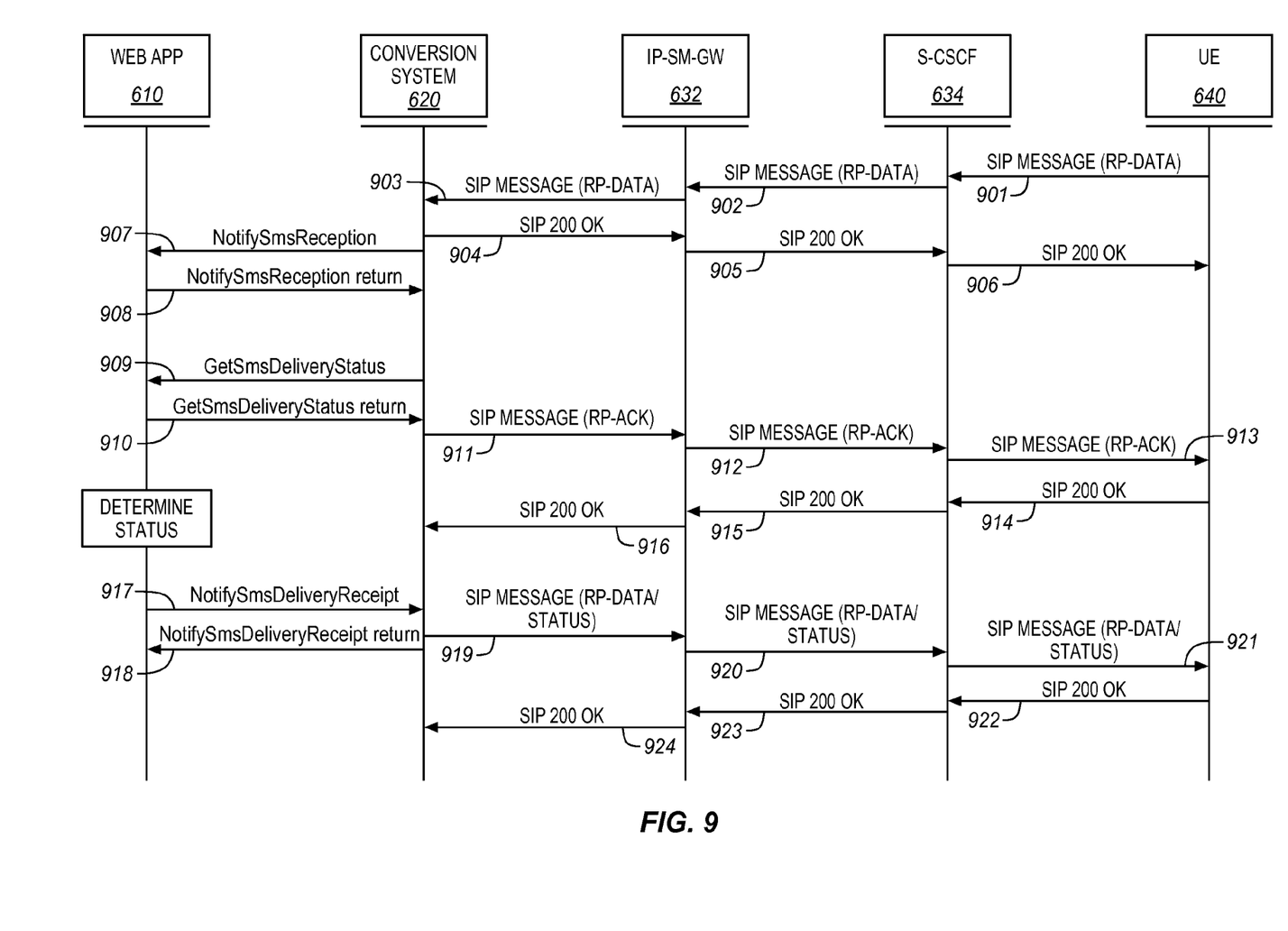
FIG. 9 is a message diagram illustrating a call flow for a MO SMS message in an exemplary embodiment.

FIG. 9 is a message diagram illustrating a call flow for a MO SMS message in an exemplary embodiment. FIG. 9 illustrates the scenario when the user of web application 610 is online when the MO SMS message is sent. Assume in this example that an end user of UE 640 creates a MO SMS message intended for web application 610. When this occurs, UE 640 generates a SIP MESSAGE that encapsulates the SMS message (in RP-DATA field), and transmits the SIP MESSAGE to conversion system 620 through IP-SM-GW 632 and S-CSCF 634 (see arrows 901-903). Conversion system 620 responds back to UE 640 with a SIP 200 OK (see arrows 904-906).

Conversion system 620 converts the SIP MESSAGE to a Parlay X NotifySmsReception command that encapsulates the MO SMS message. The NotifySmsReception command is a function call, operation, or command in Parlay X for receiving an MO SMS message in web application 610 when the user is online. Conversion system 620 then transmits the NotifySmsReception command to web application 610 (see arrow 907). Web application 610 responds back to conversion system 620 with a NotifySmsReception return (see arrow 908).

In order to translate the SIP MESSAGE into a Parlay X command, conversion system 620 may use the mappings described in Tables 1-2. When the RP-User Data field includes an SMS-SUBMIT TPDU for MO SMS messages (see 3GPP TS 23.040), the RP-User Data may have the parameters illustrated in Table 4.

TABLE 4

| Abbr. | Reference | P | Description |
|---|---|---|---|
| TP-MTI | TP-Message-Type-Indicator | M | Parameter describing the message type; set to 01 for SMS-SUBMIT. |
| TP-RD | TP-Reject-Duplicates | M | Parameter indicating whether or not the SC shall accept an SMS-SUBMIT for an SM still held in the SC which has the same TP-MR and the same TP-DA as a previously submitted SM from the same OA |
| TP-VPF | TP-VPF | M | Parameter indicating whether or not the TP-VP field is present. |
| TP-RP | TP-Reply-Path | M | Parameter indicating that Reply Path exists. |
| TP-UDHI | TP-User-Data-Header-Indicator | O | Parameter indicating that the TP-UD field contains a Header |
| TP-SRR | TP-Status-Report-Request | O | Parameter indicating if the UE is requesting a status report. If sending entity request a deliver status/receipt. Convert to Parlay X GetSmsDeliveryStatus method |
| TP-MR | TP-Message-Reference | M | Parameter identifying the SMS-SUBMIT. |
| TP-DA | TP-Destination-Address | M | Web applications address |
| TP-PID | TP-Protocol-Identifier | M | Parameter identifying the above layer protocol, if any. |
| TP-DCS | TP-Data-Coding-Scheme | M | Parameter identifying the coding scheme within the TP-User-Data. |
| TP-VP | TP-Validity-Period | O | Parameter identifying the time from where the message is no longer valid. |
| TP-UDL | TP-User-Data-Length | M | Parameter indicating the length of the TP-User-Data field to follow. |
| TP-UD | TP-User-Data | O | SMS body |

The original SIP MESSAGE from UE 640 included an embedded delivery status request in TP-SRR (see Table 4). Therefore, conversion system 620 sends a GetSmsDeliveryStatus command to web application 610 to request status information on the delivery of the MO SMS message (see arrow 909). Web application 610 responds back to conversion system 620 with a GetSmsDeliveryStatus return that includes the status information (see arrow 910).

As in the other examples, the delivery status request from UE 640 is for the SIP MESSAGE and the MO SMS message. Conversion system 620 is able to provide the status information for the SIP MESSAGE that encapsulated the MO SMS message. Because the SIP MESSAGE was successfully received (based on the GetSmsDeliveryStatus return), conversion system 620 converts the GetSmsDeliveryStatus return to a SIP MESSAGE that includes the status information for the SIP MESSAGE (embedded in the RP-ACK of the SIP MESSAGE). Conversion system 620 then sends the SIP MESSAGE with the status information to UE 640 (see arrows 911-913). UE 640 replies back to conversion system 620 with a SIP 200 OK (see arrows 914-916).

Additionally, web application 610 determines whether the MO SMS message was successfully delivered to the user, and generates status information for the MO SMS message. Web application 610 then sends a Parlay X NotifySmsDeliveryReceipt command to conversion system 620 that encapsulates the status information (see arrow 917). Conversion system 620 replies to web application 610 with a NotifySmsDeliveryReceipt return (see arrow 918).

Conversion system 620 converts the NotifySmsDeliveryReceipt command to a SIP MESSAGE that includes the status information for the MO SMS message (embedded in the RP-DATA/Status of the SIP MESSAGE). Conversion system 620 then sends the SIP MESSAGE to UE 640 (see arrows 919-921). UE 640 replies back to conversion system 620 with a SIP 200 OK (see arrows 922-924). IMS network 630 and/or UE 940 may then process the status information as desired. There may be additional messaging that is used to deliver the MO SMS message and its associated status information, as FIG. 9 gives an overview of the messaging used in the SMS delivery.

Figure 10:
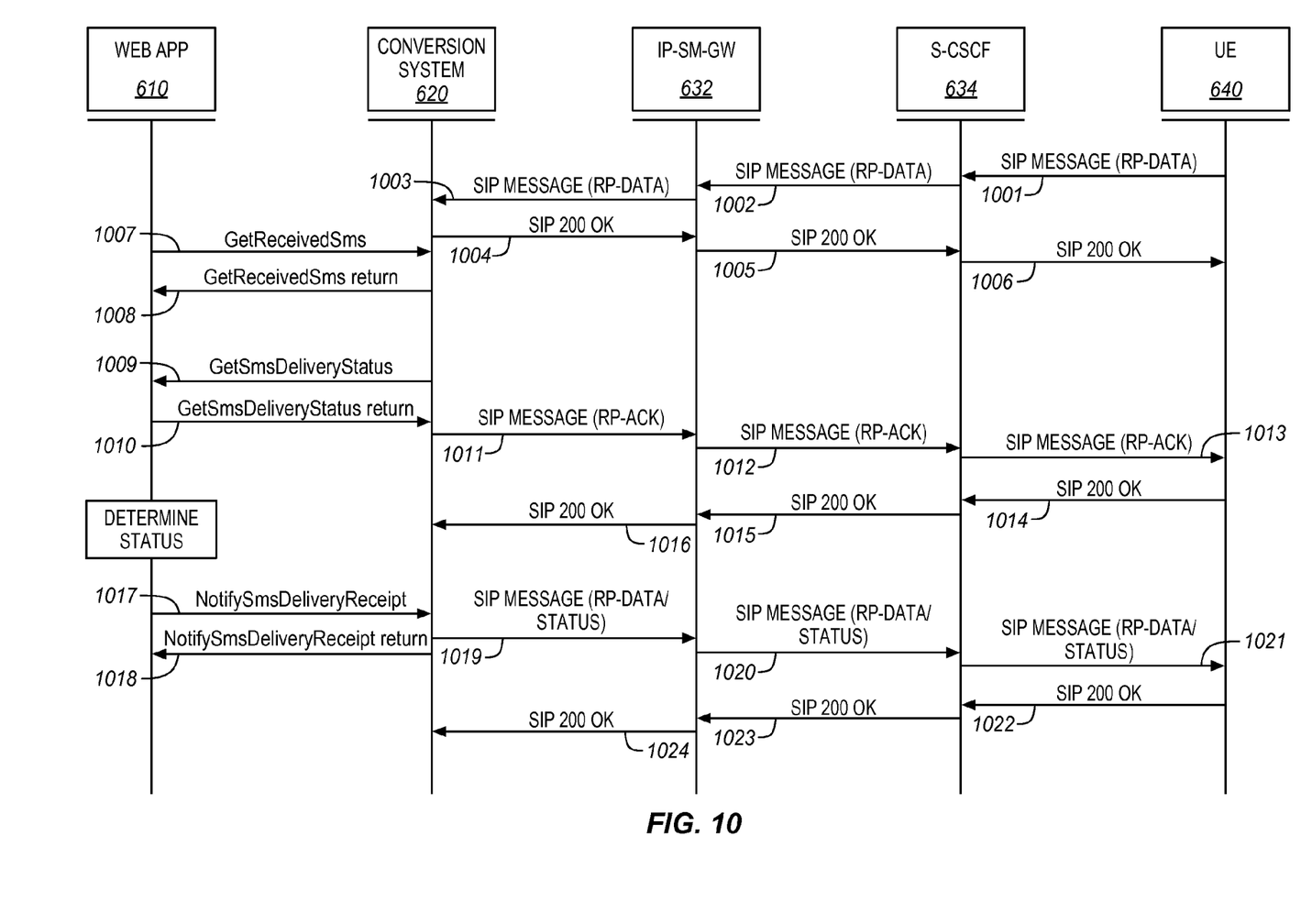
FIG. 10 is a message diagram illustrating another call flow for a MO SMS message in an exemplary embodiment.

FIG. 10 is a message diagram illustrating another call flow for a MO SMS message in an exemplary embodiment. FIG. 10 illustrates the scenario when the user of web application 610 is offline when the MO SMS message is sent. The flow in FIG. 10 is similar to FIG. 9 where UE 640 sends a SIP MESSAGE to conversion system 620 that encapsulates an MO SMS message (see arrows 1001-1006). Because the user of web application 610 is offline at the time, conversion system 620 stores the MO SMS message. When the user logs into web application 610, web application 610 sends a Parlay X GetReceivedSms command to conversion system 620 to retrieve the MO SMS message that is stored for the user (see arrow 1007). Conversion system 620 then converts the MO SMS message into a Parlay X GetReceivedSms return that encapsulates the MO SMS message, and transmits the GetReceivedSms return to web application 610 (see arrow 1008). The flow in FIG. 10 then continues as in FIG. 9 to provide status information for the MO text message to UE 640 (see arrows 1009-1024).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A method comprising:
   receiving, in a conversion system, a send command for a Mobile Terminated (MT) text message from a web application that is coupled to a packet-switched network through the conversion system, wherein the send command is based on a standard used by the web application;
   converting, in the conversion system, the send command for the MT text message to a Session Initiation Protocol (SIP) send request for the MT text message; and
   transmitting the SIP send request for the MT text message from the conversion system to the packet-switched network.

2. The method of claim 1 wherein:
   the send command from the web application is based on a Parlay X standard.

3. The method of claim 1 wherein:
   the SIP send request for the MT text message comprises a SIP MESSAGE that encapsulates the MT text message.

4. The method of claim 1 wherein the MT text message comprises a Short Messaging Service (SMS) message.

5. The method of claim 1 wherein the MT text message comprises a Multimedia Messaging Service (MMS) message.

6. The method of claim 1 further comprising:
   receiving a SIP status message from the packet-switched network indicating a delivery status for at least one of the SIP send request and the MT text message;
   converting the SIP status message to a status command in the standard used by the web application; and
   transmitting the status command to the web application.

7. The method of claim 1 further comprising:
   receiving a SIP send request for a Mobile Originated (MO) text message from the packet-switched network in the conversion system;
   converting, in the conversion system, the SIP send request for the MO text message to a receive command for the MO text message, wherein the receive command for the MO text message is based on the standard used by the web application; and
   transmitting the receive command for the MO text message from the conversion system to the web application.

8. The method of claim 7 further comprising:
   receiving a status command from the web application indicating a delivery status for the MO text message;
   converting the status command to a SIP status message; and
   transmitting the SIP status message to the packet-switched network.

9. The method of claim 1 wherein:
the packet-switched network comprises an IP Multimedia Subsystem (IMS) network or a Long Term Evolution (LTE) network.

* * * * *